Nov. 13, 1934.    J. J. BACKES    1,980,247
POULTRY FEEDER OR WATERING TROUGH
Filed Aug. 4, 1933
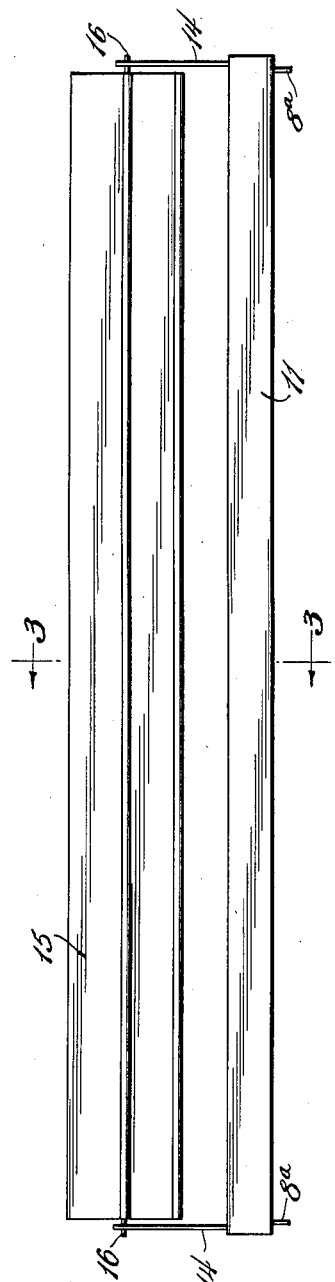
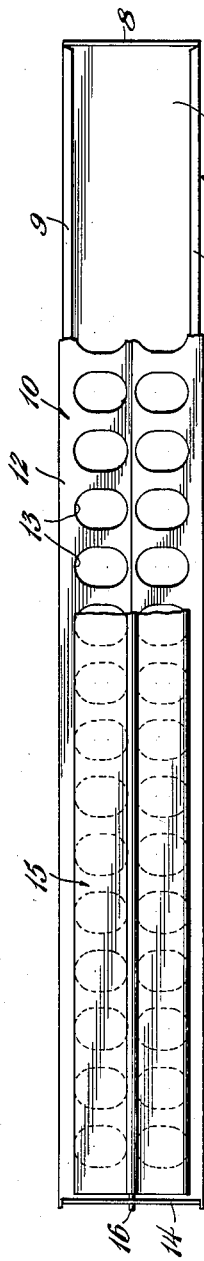
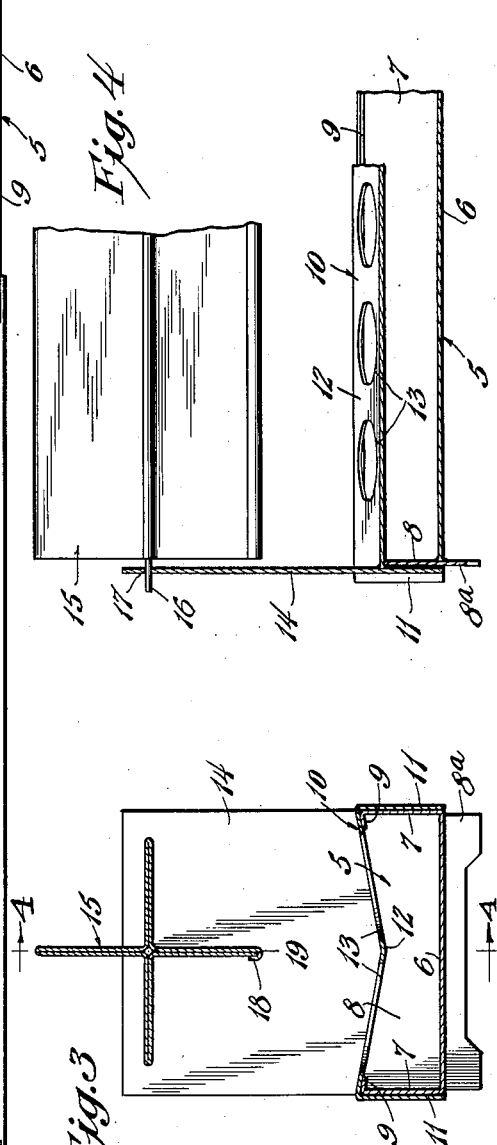
Inventor
J. J. Backes

UNITED STATES PATENT OFFICE 1,980,247

POULTRY FEEDER OR WATERING TROUGH

John J. Backes, Washington, Ind.

Application August 4, 1933, Serial No. 683,682

1 Claim. (Cl. 119—61)

This invention relates to poultry feeders or watering troughs, and among other objects, aims to provide an improved device of this character which is of simple and strong construction, so that it is inexpensive to manufacture, yet will withstand exposure to the weather and careless handling, which will nearly eliminate soiling of the feed or water, and which is very easily dismantled for replenishing of the feed or water, or for cleansing.

In the accompanying drawing forming a part of this specification and illustrating a preferred embodiment of the invention,—

Fig. 1 is an elevation;

Fig. 2 is a plan view, with parts broken away to expose the construction beneath;

Fig. 3 is an enlarged section on line 3—3 of Fig. 1; and

Fig. 4 is a section on line 4—4 of Fig. 3.

Referring particularly to the drawing, there is shown a feeder or watering trough for poultry comprising three principal parts, namely, a body, a cover and a guard or baffle. The body 5 is trough-shaped, and comprises a bottom 6, side walls 7 and end walls 8, the latter preferably extending below the bottom to provide legs 8ª for the body, as is clearly shown. The side walls 7 have inturned flanges 9 extending along their upper edges and serving to stiffen the body and also to aid in supporting the cover 10, which preferably fits snugly over the body.

As shown, the cover 10 has side flanges 11, which lie outside the side walls 7 when the cover is in position, and a top 12 with perforations 13 each large enough to permit a fowl to feed or drink through it. The top wall 12 is preferably gutter-shaped, so that any feed spilled on it gravitates into the perforations or toward the middle, where it collects until eaten or brushed by the bills of the fowls into the perforations, thus remingling with the feed in the trough body. At the ends of the cover 10 are integral, upright arms 14, providing supports for the guard or baffle 15.

Preferably the guard or baffle 15 is composed of a single piece of metal, cruciform in cross-section, with pin pivots 16 at the ends passing through perforations 17 in the uprights 14. The metal strip from which the guard is formed is initially flat, and is bent to provide four arms or fins, each extending at 90° to the others on either side, each fin being of double thickness, and the end edge 18 being reversely bent over the edge 19. The described guard is self-balancing, and will rotate on its longitudinal axis if a fowl attempts to roost on it, thus throwing the fowl off. It is so spaced and located relative to the top 10 that it does not obstruct access to the feed or water in the trough body, even when rotating, but effectually prevents the fowls from standing on the top 10 when feeding or drinking. Thus the contents of the trough body are not likely to be fouled. And because of the shape of the cover 10, the feed is not likely to be scattered.

The entire device is preferably made from thin galvanized iron or other non-corroding metal. As the cover and attached parts are easily lifted off the body, access to the latter for replenishing of the feed or for cleansing is facilitated. The device may be easily cleaned with running water, and provides a most satisfactory medium for feeding and/or watering all kinds of domestic fowls.

Obviously, the invention is not limited to the preferred embodiment which is disclosed herein.

What I claim is:—

A poultry feeder or watering device comprising, in combination, a trough-like body; a cover closing the top of the body; said cover being gutter-shaped and having perforations large enough to permit the poultry to feed or drink through them; and a guard rotatably mounted on and extending above the cover and being sufficiently spaced from the perforations to permit feeding when the fowls stand on the ground; while preventing the fowls from standing on the cover; said guard being cruciform in cross-section and being made of a single piece of thin sheet metal with four fins each of double thickness and the edges being overlapped.

JOHN J. BACKES.